(12) United States Patent
Atsuumi et al.

(10) Patent No.: US 7,525,710 B2
(45) Date of Patent: Apr. 28, 2009

(54) SCANNING AND IMAGING OPTICAL SYSTEM, OPTICAL SCANNER, AND IMAGE FORMING APPARATUS WITH LENSES OF DIFFERENT SIGNS AND REFRACTIVE INDEX DISTRIBUTION INCREASING TOWARD RIM

(75) Inventors: Hiromichi Atsuumi, Tokyo (JP); Yasuo Yamanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 11/129,340

(22) Filed: May 16, 2005

(65) Prior Publication Data

US 2005/0280884 A1    Dec. 22, 2005

(30) Foreign Application Priority Data

Jun. 18, 2004  (JP) .............................. 2004-181294

(51) Int. Cl.
   *G02B 26/08* (2006.01)
(52) U.S. Cl. ..................................... 359/207
(58) Field of Classification Search ................. 359/205, 359/652–654, 207
   See application file for complete search history.

(56) References Cited

U.S. PATENT DOCUMENTS

| | | | | |
|---|---|---|---|---|
| 4,859,040 A | * | 8/1989 | Kitagishi et al. | 359/652 |
| 5,600,476 A | * | 2/1997 | Takada et al. | 359/206 |
| 6,313,935 B1 | * | 11/2001 | Makino | 359/206 |
| 6,532,094 B2 | * | 3/2003 | Suhara | 359/205 |
| 6,801,374 B2 | * | 10/2004 | Kuroda et al. | 359/811 |
| 2001/0048542 A1 | * | 12/2001 | Suhara | 359/205 |
| 2003/0063358 A1 | * | 4/2003 | Suhara | 359/205 |
| 2003/0218788 A1 | * | 11/2003 | Sakai et al. | 359/205 |

FOREIGN PATENT DOCUMENTS

| | | |
|---|---|---|
| JP | 2-210412 | 8/1990 |
| JP | 8-201717 | 8/1996 |
| JP | 11-44641 | 2/1999 |
| JP | 2003-344756 | 12/2003 |
| JP | 3503929 | 12/2003 |

\* cited by examiner

*Primary Examiner*—Stephone B. Allen
*Assistant Examiner*—Jennifer L. Doak
(74) *Attorney, Agent, or Firm*—Oblon, Spivak, McClelland, Maier & Neustadt, P.C.

(57) ABSTRACT

A scanning and imaging optical system that condenses beams of light deflected by an optical deflector toward a surface to be scanned to form a light spot for optical scanning on the surface includes plurality of scanning lenses. Among the scanning lenses, at least two of the scanning lenses are resin lenses that are formed by plastic molding, and where a position coordinate in a horizontal scanning direction or in a vertical scanning direction is X, refractive index distribution in a cross-section with respect to the position coordinate X is $\Delta n(X)$, the refractive index distribution in a cross-section in the horizontal scanning direction that includes an optical axis or in the vertical scanning direction of the resin lenses, signs of the refractive index distribution $\Delta n(X)$ at least in the vertical scanning direction are not identical for all of the resin lenses.

13 Claims, 7 Drawing Sheets

FIELD CURVATURE

FIELD CURVATURE

FIELD CURVATURE

SCANNING AND IMAGING OPTICAL SYSTEM, OPTICAL SCANNER, AND IMAGE FORMING APPARATUS WITH LENSES OF DIFFERENT SIGNS AND REFRACTIVE INDEX DISTRIBUTION INCREASING TOWARD RIM

CROSS-REFERENCE TO RELATED APPLICATIONS

The present document incorporates by reference the entire contents of Japanese priority document, 2004-181294 filed in Japan on Jun. 18, 2004.

BACKGROUND OF THE INVENTION

1) Field of the Invention

The present invention relates to a scanning and imaging optical system, an optical scanner, and an image forming apparatus.

2) Description of the Related Art

Optical scanners associated with image forming apparatuses, such as a laser printer and a digital copying machine, perform optical scanning with an optical deflector and a scanning and imaging optical system. The optical deflector deflect beams of light from a light source, and the scanning and imaging optical system condenses the beams deflected toward a surface to be scanned to form a light spot on the surface. Thus, the optical scanning is performed. Recently, as the scanning and imaging optical system or a part of the scanning and imaging optical system, a resin lens that is manufactured by molding plastic is generally used. The resin lens can be easily mass-produced at a low production cost. Therefore, if the resin lens is applied to the scanning and imaging optical system or a part of the scanning and imaging optical system, manufacturing cost for the optical scanner and the image forming apparatus can be effectively reduced.

Furthermore, with the resin lens, a special lens surface, such as an aspheric surface, can be easily obtained. Therefore, the resin lens largely contributes to a simplified structure of the scanning and imaging optical system by reducing the number of lenses and to improved optical performance.

However, the resin lens has a disadvantage in which refractive index distribution occurs inside the resin lens. In plastic molding, a thermally melted plastic is injected into a metallic mold and cooled down in the metallic mold. The plastic inside the metallic mold is cooled down gradually from a portion touching a surface of the metallic mold. A portion of the plastic located near a core of the metallic mold is cooled down relatively slowly. Resin solidifies and contracts when cooled down, and a volume of the resin decreases. Therefore, the portion cooled down earlier, which is the portion to be a periphery of the resin lens, solidifies before the portion to be cooled down later solidifies. If there is the portion not yet solidified, which has higher temperature and fluidity, in the metallic mold while a part of the plastic is solidified, the portion not yet solidified moves toward the portion solidified, of which the volume has decreased. As a result, the portion to be cooled down later becomes a solid having lower density when solidified.

Thus, in a cooling process in the plastic molding, nonuniform distribution occurs in density inside the resin lens. Since a refractive index of resin is proportional with density of resin, nonuniformity in the density leads to nonuniformity in the refractive index inside the resin lens. In the resin lens, since the density is higher at the portion near the surface than the portion inside the resin lens away from the surface, the refractive index is lowest at an inner deepest portion of the resin lens and gradually becomes higher toward the surface.

Nonuniformity in the refractive index also depends on a shape of the resin lens. For example, in a resin lens having a double-convex cross-section, a thickness of the resin lens decreases from a portion around an optical axis toward a rim of the resin lens. In the cooling process at manufacturing such resin lens, the portion near the optical axis takes more time to be cooled down than a portion near the rim. In such a case, the refractive index is higher at the portion near the rim and is lower at the portion around the optical axis.

In contrast, in a resin lens having a double-concave cross-section, the thickness of the resin lens increases from the portion around the optical axis toward the portion near a rim of the resin lens. Therefore, the portion near the rim takes more time to be cooled down than the portion around the optical axis. As a result, the refractive index is higher at the portion around the optical axis and is lower at the portion near the rim.

Since design of the resin lens is carried out assuming a uniform refractive index, if the refractive index is nonuniform in the resin lens manufactured, performance expected at a designing stage cannot be obtained. When the resin lens is used as the scanning and imaging optical system or a part thereof, an imaging position of the deflected beams is deviated from a position designed, and a field curvature deteriorates, resulting in an increase in a spot diameter of the light spot.

If a resin lens is molded in such a manner that resin in the metallic mold is put in a thermostatic chamber to be cooled down over a sufficiently long time, for example, more than 10 hours, the refractive index distribution inside the resin lens can be made substantially uniform. However, such method decreases productivity of the resin lens, and increases the manufacturing cost. As a result, low cost, which is supposed to be a merit of the resin lens, cannot be realized.

An optical scanner with excellent performance that is realized by considering the refractive index distribution inside a resin lens is disclosed in Japanese Patent Application Laid-Open No. 2003-344756. Furthermore, a tolerance of the resin lens used in an optical scanner in the refractive index distribution is disclosed in Japanese Patent Application Laid-Open No. 2000-352679. A method for measuring the refractive index distribution inside a resin lens is described in Japanese Patent Application Laid-Open No. H11-044641.

SUMMARY OF THE INVENTION

It is an object of the present invention to at least solve the problems in the conventional technology.

A scanning and imaging optical system according to one aspect of the present invention condenses beams of light deflected by an optical deflector toward a surface to be scanned, to form a light spot for optical scanning on the surface, and includes a plurality of scanning lenses. At least two of the scanning lenses are resin lenses that are formed by plastic molding, and where a position coordinate in a horizontal scanning direction or in a vertical scanning direction is X, refractive index distribution in a cross-section in the horizontal scanning direction that includes an optical axis or in the vertical scanning direction of the resin lenses with respect to the position coordinate X is $\Delta n(X)$, and signs of the refractive index distribution $\Delta n(X)$ at least in the vertical scanning direction are not identical for all of the resin lenses.

An optical scanner according to another aspect of the present invention performs optical scanning by deflecting beams of light from a light source by an optical deflector, and condensing the beams deflected toward a surface to be scanned to form a light spot on the surface, and includes a scanning and imaging optical system according to the above aspect.

An image forming apparatus according to still another aspect of the present invention forms an image by performing optical scanning on a photosensitive medium, and includes an optical scanner according to the above aspect.

The other objects, features, and advantages of the present invention are specifically set forth in or will become apparent from the following detailed description of the invention when read in conjunction with the accompanying drawings.

The other objects, features, and advantages of the present invention are specifically set forth in or will become apparent from the following detailed description of the invention when read in conjunction with the accompanying drawings.

DETAILED DESCRIPTION

Exemplary embodiments according to the present invention will be explained in detail with reference to the accompanying drawings.

Figure 1:
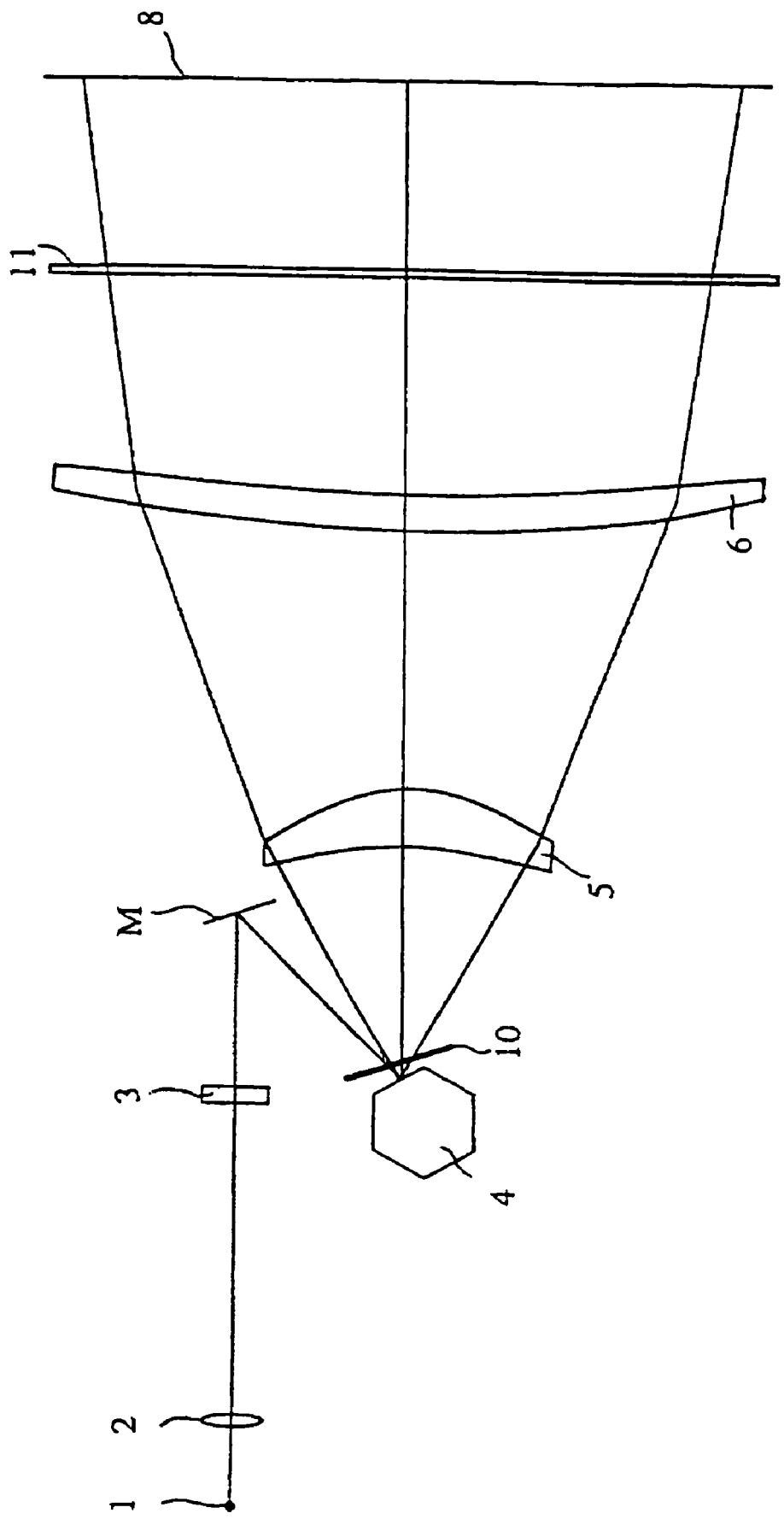
FIG. 1 is a schematic of an optical scanner according to a first embodiment of the present invention.

FIG. 1 is a schematic of an optical scanner according to a first embodiment of the present invention. Divergent beams emitted from a light source 1 that is a semiconductor laser are converted to substantially parallel beams by a coupling lens 2. The parallel beams are reflected by a mirror M, while being converged in a vertical scanning direction by a cylindrical lens 3, and formed as a line image long in a horizontal scanning direction near a deflection reflecting surface of a polygon mirror 4 that is a rotary polygon mirror as an optical deflector. The beams reflected from the deflection reflecting surface becomes beams of light deflected at the same angular speed, with the rotation of the polygon mirror 4 at a uniform velocity. The beams deflected then pass through scanning lenses 5 and 6 and a dustproof glass 11, and are guided to a surface 8 to be scanned. Thus, the beams deflected are condensed as a light spot. The scanning lenses 5 and 6 constitute a scanning and imaging optical system. Reference sign 10 denotes a soundproof glass of a housing provided for intercepting noises of the polygon mirror. The mirror M may be omitted, according to arrangement of the optical scanner. The scanning lenses 5 and 6 are resin lenses that are formed by plastic molding.

A specific numerical example of design values will be explained below.

Light Source 1 (Semiconductor Laser)
  Emission wavelength: 655 nanometers (nm)

Coupling Lens 2
  Focal length: 27 millimeters (mm)
  Coupling action: collimating action Polygon Mirror 4
  Number of deflection reflecting surfaces: 5
  Radius of inscribed circle: 18 mm
  Angle between principal ray of beams from the light source side and an optical axis of the scanning optical system: 58 degrees A surface of the scanning lens 5 on an incident side and surfaces of the scanning lens 6 on both sides are expressed by following equations (1) and (2).

A shape of the surface shape of a cross-section in the horizontal scanning direction is a non-circular arc shape, and is expressed by the following polynomial (1), where Rm is a radius of paraxial curvature in a horizontal scanning surface of an optical axis, Y is a distance in the horizontal scanning direction from the optical axis, K is a conical constant, A1, A2, A3, A4, A5, A6, . . . are higher-order coefficients, and X is a depth in a direction of the optical axis.

$$X = (Y^2/Rm)/\left[1 + \sqrt{\{1-(1+K)(Y/Rm)^2\}}\right] + A1 \cdot Y + \\ A2 \cdot Y^2 + A3 \cdot Y^3 + A4 \cdot Y^4 + A5 \cdot Y^5 + A6 \cdot Y^6 + \ldots \quad (1)$$

If a number other than 0 is included in the odd-order coefficients A1, A3, A5, . . . , the horizontal scanning non-circular arc shape becomes asymmetrical with respect to the optical axis relating to the horizontal scanning direction. In this example, only the even-order coefficients are used, and hence, the horizontal scanning non-circular arc shape is symmetrical with respect to the horizontal scanning direction.

A state of a curvature in the vertical scanning cross-section Cs(Y) changing according to the coordinate Y in the horizontal scanning direction is expressed by a following equation (2).

$$Cs(Y) = \{1/Rs(0)\} + B1 \cdot Y + B2 \cdot Y^2 + B3 \cdot Y^3 + B4 \cdot Y^4 + B5 \cdot Y^5 + \quad (2)$$

In equation (2), if any one of the odd-order coefficients B1, B3, B5, . . . of a variable Y is not 0, the curvature in the vertical scanning cross-section changes asymmetrically in the horizontal scanning direction.

A surface on an outgoing side of the scanning lens 5 is a coaxial aspheric surface.

The coaxial aspheric surface is expressed by a following equation (3), where R is a radius of paraxial curvature, r is a distance from the optical axis, k is a conical constant, a1, a2, a3, . . . are higher-order coefficients, and Z is a depth in the direction of the optical axis.

$$Z = (r^2/R)/\left[1 + \sqrt{\{1-(1+k)(r/R)^2\}}\right] + \\ a1 \cdot r + a2 \cdot r^2 + a3 \cdot r^3 + a4 \cdot r^4 + \ldots \quad (3)$$

Shape of incident side of scanning lens 5
Rm=−279.9, Rs=−61.0
K=−2.900000E+01, A4=1.755765E−07, A6=−5.491789E−11,
A8=1.087700E−14, A10=−3.183245E−19, A12=−2.635276E−24
B1=−2.066347E−06, B2=5.727737E−06, B3=3.152201E−08, B4=2.280241E−09, B5=−3.729852E−11, B6=−3.283274E−12,

B7=1.765590E-14, B8=1.372995E-15, B9=-2.889722E-18, B10=-1.984531E-19

Shape of outgoing side of scanning lens 5
R=-83.6, k=-0.549157
a4=2.748446E-07, a6=-4.502346E-12, a8=-7.366455E-15, a10=1.803003E-18, a12=2.727900E-23

Shape of incident side of scanning lens 6
Rm=6950, Rs=110.9
K=0.000000E+00, A4=1.549648E-08, A6=1.292741E-14, A8=-8.811446E-18, A10=-9.182312E-22,
B1=-9.593510E-07, B2=-2.135322E-07, B3=-8.079549E-12,
B4=2.390609E-12, B5=2.881396E-14, B6=3.693775E-15,
B7=-3.258754E-18, B8=1.814487E-20, B9=8.722085E-23, B10=-1.340807E-23

Shape of outgoing side of scanning lens 6
Rm=766, Rs=-68.22
K=0.000000E+00, A4=-1.150396E-07, A6=1.096926E-11, A8=-6.542135E-16, A10=1.984381E-20, A12=-2.411512E-25,
B2=3.644079E-07, B4=-4.847051E-13, B6=-1.666159E-16,
B8=4.534859E-19, B10=-2.819319E-23

A refractive index of a material (ZEONE X E-48R, manufactured by Zeone Corporation) of the scanning lenses 5 and 6 is 1.52724 (in design) when a wavelength of 655 nm is applied. In the description above, for example, "-2.819319E-23" means "$-2.819319 \times 10^{-23}$".

Optical arrangement

Distance from deflection reflecting surface to incident side of scanning lens 5: d1=64 mm Thickness of scanning lens 5 at center: d2=22.6 mm Height of scanning lens 5 in vertical scanning direction (lens width in vertical scanning direction): 6.4 mm Effective width of scanning lens 5 in vertical scanning direction: 3.4 mm Distance from outgoing side of scanning lens 5 to incident side of scanning lens 6: d3=75.9 mm Refractive index distribution of scanning lens 5 in vertical scanning direction: $\Delta n$=8E-06

Thickness of scanning lens 6 at center: d4=4.9 mm

Height of scanning lens 6 in vertical scanning direction: 14.3 mm

Effective width of scanning lens 6 in vertical scanning direction: 6 mm

Distance from outgoing side of scanning lens 6 to surface to be scanned: d5=158.7 mm Refractive index distribution of scanning lens 6 in vertical scanning direction: $\Delta n$=-1.8E-05

The soundproof glass 10 and the dustproof glass 11 respectively having a refractive index of 1.514 and a thickness of 1.9 mm are arranged as shown in FIG. 1, and the soundproof glass 10 is inclined by 10 degrees with respect to a direction parallel to the horizontal scanning direction in the horizontal scanning surface.

Figure 2A:
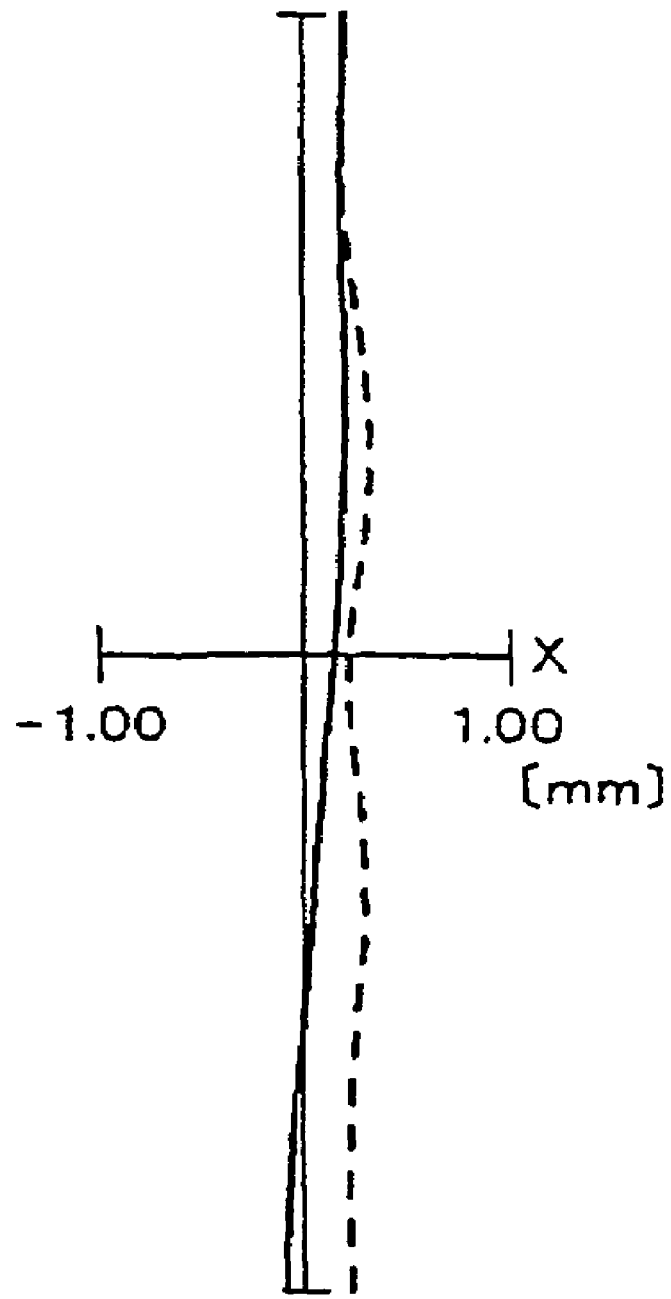
FIG. 2A is a schematic for illustrating a field curvature of a scanning lens in an example in design.

FIG. 2A is a schematic for illustrating a field curvature in design of the optical system in the example, that is, a field curvature when the scanning lenses 5 and 6 do not have nonuniform refractive index distribution. Solid line denotes a field curvature in the vertical scanning direction, and broken line denotes a field curvature in the horizontal scanning direction.

Figure 4A:
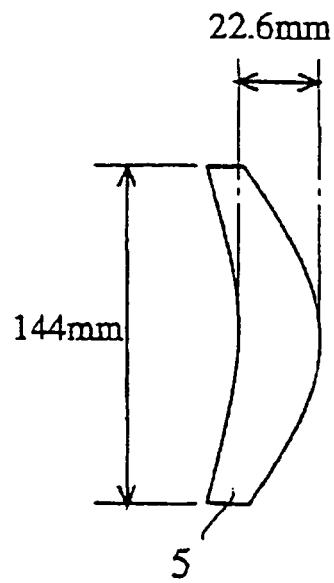
FIGS. 4A to 4D are schematics for explaining shapes of the scanning lenses shown in FIG. 1.
Figure 4B:
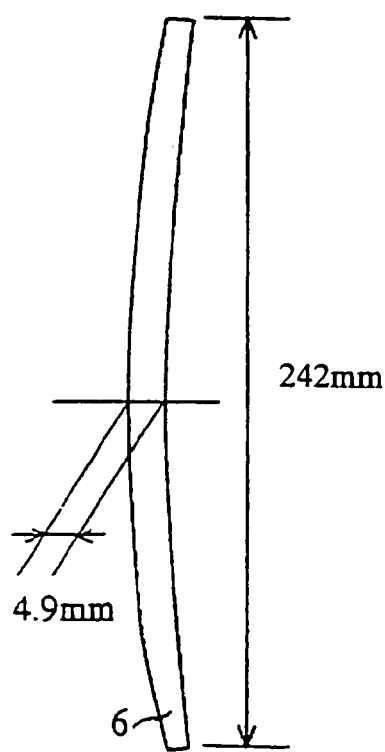
Figure 4C:
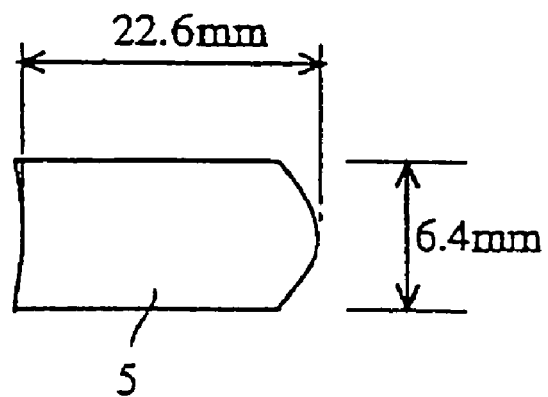

As shown in FIG. 4A, the scanning lens 5 has a length of 144 mm in the horizontal scanning direction, a thickness of 22.6 mm at a position on the optical axis, and a lens width of 6.4 mm in the vertical scanning direction, as shown in FIG. 4C in which a sectional shape in the vertical scanning cross-section including the optical axis is shown. An effective width in the vertical scanning direction (a width of a region in which effective optical action can be realized with respect to the deflected beams) is 3.4 mm.

That is, the scanning lens 5 has a relation of "thickness in the direction of optical axis: 22.6 mm>lens width in the vertical scanning direction: 6.4 mm", and has a positive power both in the horizontal and vertical scanning directions.

Figure 4D:
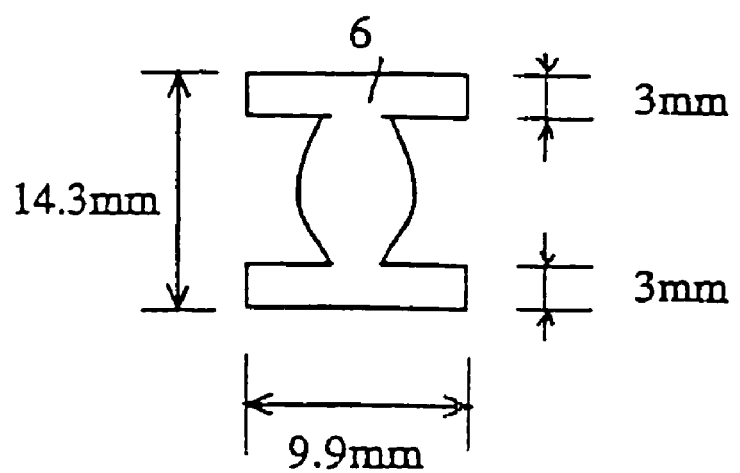

The scanning lens 6 has a length of 242 mm in the horizontal scanning direction, and a thickness of 4.9 mm at a position on the optical axis. As shown in FIG. 4D in which a sectional shape in the vertical scanning cross-section including the optical axis is shown, the scanning lens 6 is a double-convex lens in the vertical scanning direction, and has a positive power both in the horizontal and vertical scanning directions.

The scanning lens 6 further includes ribs outside a beam passing area in the vertical scanning direction, and the width of the rib in the direction of the optical axis is larger than the thickness in the direction of the optical axis.

That is, as shown in FIG. 4D, the height in the vertical scanning direction is 14.3 mm including the ribs, the thickness of the rib is 3 mm, and the width of the rib in the direction of the optical axis is 9.9 mm. That is, the thickness at the position of the optical axis: 4.9 mm is smaller than the width of the rib in the direction of the optical axis: 9.9 mm.

Figure 3A:
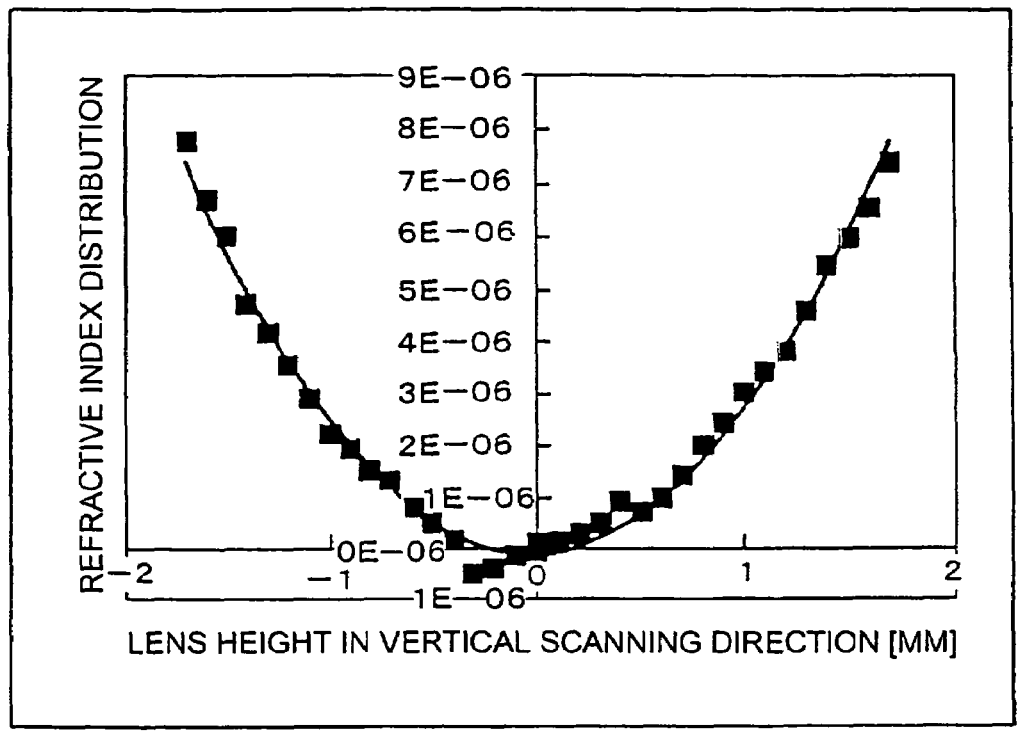
FIGS. 3A and 3B are distribution graphs for illustrating the refractive index distribution in the vertical scanning direction in the scanning lenses in FIG. 1.

FIG. 3A depicts "refractive index distribution in the vertical scanning direction at a position of the optical axis" of the scanning lens 5. The refractive index distribution: $\Delta n(X)$ is expressed as $$\Delta n(X) = \Delta n \cdot X^2$$

where X is a coordinate in the vertical scanning direction, with the optical axis being an origin, and when $\Delta n = \Delta n = $8E-06 is applied, $$\Delta n(X) = 8 \times 10^{-6} \cdot X^2$$

The scanning lens 5 is, as shown in FIGS. 4A and 4C, thick in the direction of the optical axis, with the sectional shape being substantially rectangular. Since the resin is cooled down from a peripheral portion (of the sectional shape) at the time of molding the lens, the scanning lens 5 has density distribution such that the density is high in the peripheral portion, and the density becomes lower toward a central portion, and the refractive index distribution in the vertical scanning direction is as described above.

Figure 3B:
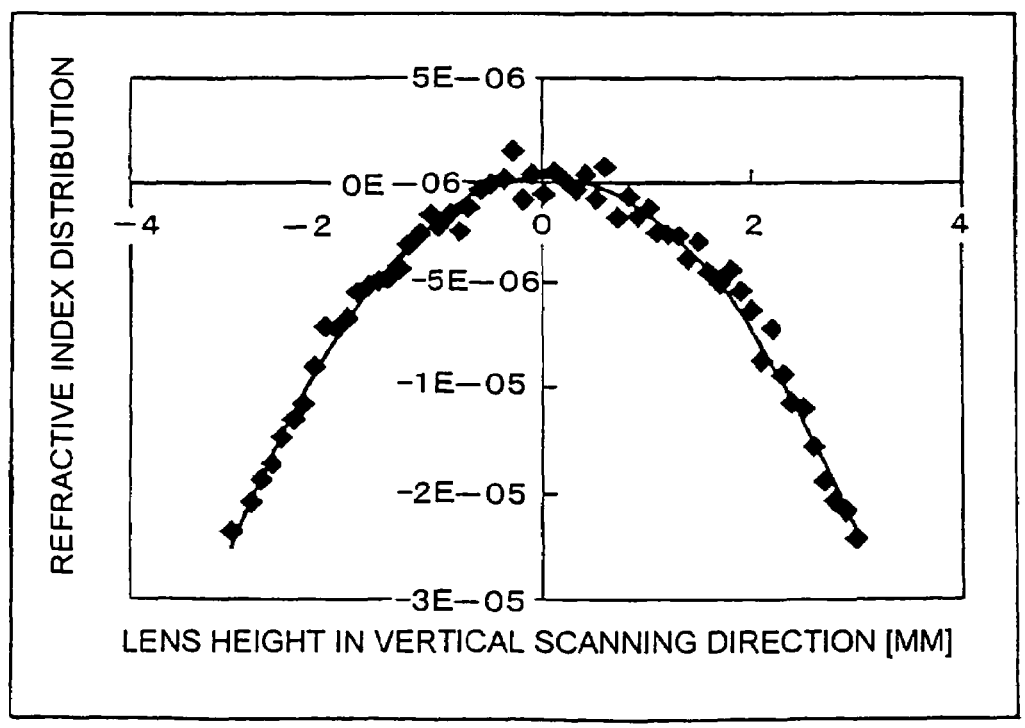

FIG. 3B depicts refractive index distribution in the vertical scanning direction at a position of the optical axis of the scanning lens 6. The refractive index distribution: $\Delta n(X)$ is expressed by:

$$\Delta n(X) = \Delta n \cdot X^2$$

where X is a coordinate in the vertical scanning direction, with the optical axis being an origin", and when $\Delta n = \Delta n = $-1.8E-05 is applied, $$\Delta n(x) = -1.8 \times 10^{-5} \cdot X2$$

As shown in FIGS. 4B and 4D, the scanning lens 6 has a relatively small thickness (4.9 mm) in the direction of the optical axis, and since it has a rib structure, the portions around the rib become thick. Since the resin is cooled first from the portion near the optical axis, at the time of molding, rather than the portions near the ribs, the scanning lens 6 has density distribution such that the density is high in the central portion, and the density becomes lower toward the ribs. Therefore, the refractive index in the vertical scanning direction in a beam-passing lens area becomes lower in the peripheral portion than in the central portion.

Figure 2B:
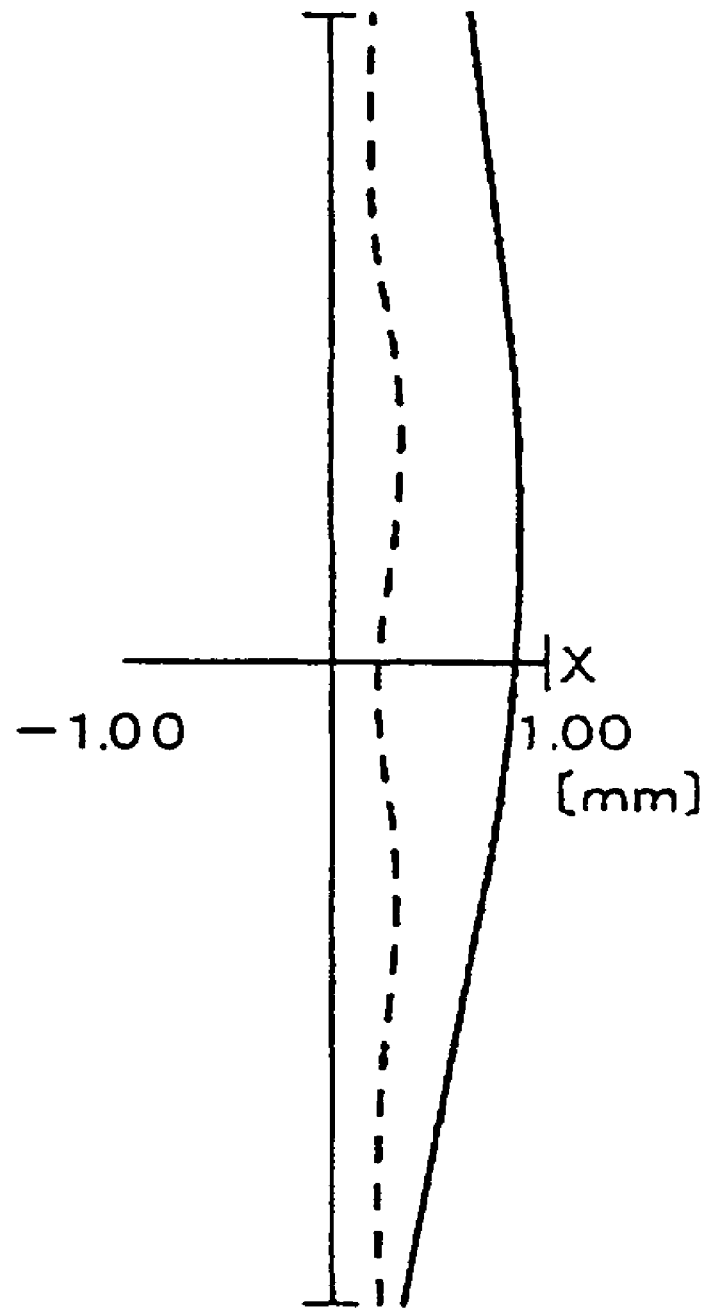
FIG. 2B is a schematic for illustrating a field curvature when a scanning lens has refractive index distribution in a vertical scanning direction.

In the optical system, when the field curvature is calculated by performing ray tracing by simulation, on the assumption that the scanning lens 6 has uniform refractive index in the lens, and there is the refractive index distribution in the vertical scanning direction as described above only in the scanning lens 5, the field curvature becomes as shown in FIG. 2B.

It is understood that the field curvature in the vertical scanning direction (shown with a solid line) is deteriorated toward a positive side compared to the field curvature in design (FIG. 2A). This is because the sign of the refractive index distribution in the scanning lens 5 is positive, and the positive power of the scanning lens 5 is weakened.

At the time of calculation, it is assumed that the refractive index distribution ($\Delta n(X)=8\times 10^{-6}\cdot X^2$) shown in FIG. 3A occurs uniformly over the horizontal scanning direction of the scanning lens 5. This assumption does not substantially conflict with the actual measurement. That is, the actually measured refractive index distribution in the vertical scanning direction hardly changes in the horizontal scanning direction.

Figure 2C:
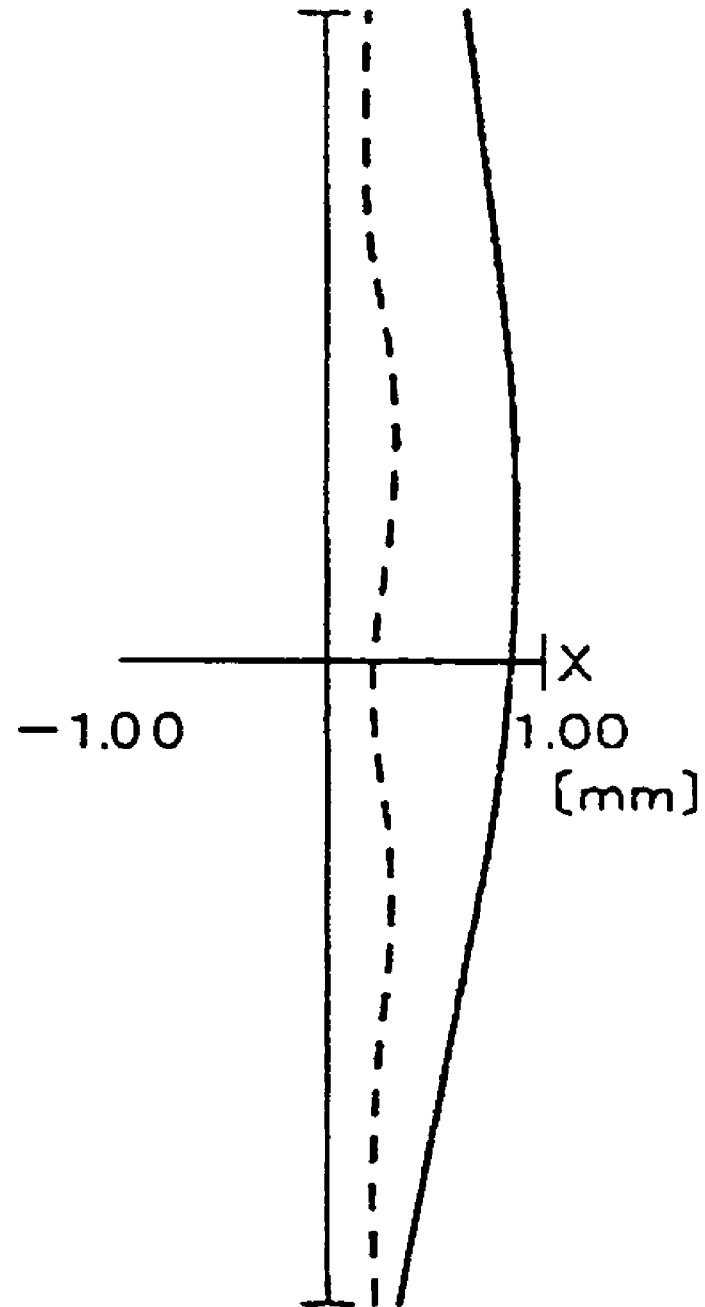
FIG. 2C is a schematic for illustrating a field curvature when a scanning lens 5 and a scanning lens 6 have refractive index distribution in the vertical scanning direction of different signs.

When the field curvature is calculated by performing ray tracing by simulation, by giving the above refractive index distribution $\Delta n(X)=-1.8\times 10^{-5}\cdot X^2$ to the scanning lens 6, the field curvature becomes as shown in FIG. 2C. As it is obvious in FIG. 2C, it is understood that the field curvature in the vertical scanning direction is corrected so as to approach the field curvature in design. In this calculation, it is also assumed that the refractive index distribution ($\Delta n(X)=-1.8\times 10^{-5}\cdot X^2$) shown in FIG. 3B occurs uniformly over the horizontal scanning direction of the scanning lens 6. Also in the scanning lens 6, the refractive index distribution in the vertical scanning direction actually measured hardly changes in the horizontal scanning direction.

Therefore, by combining lenses having signs of the refractive index distribution in the vertical scanning direction opposite to each other as the scanning lenses 5 and 6, deterioration in the field curvature in the vertical scanning direction can be effectively reduced, and hence, a decrease in resolution due to an increase in the diameter of the light spot can be effectively suppressed.

The scanning lens 5 has the above shape, and is injection-molded using cycloolefin polymer (having a glass transition point of 138 degree Celsius (° C.)) as a material, under the following molding conditions:

Temperature of metal molding: 136° C.;
Resin temperature: 280° C.;
Injection speed: 20 mm/second (sec);
Injection pressure: 80 mega pascals (MPa);
Cooling time: 300 seconds.

The scanning lens 6 has the above shape, and is injection-molded using cycloolefin polymer as a material, under the following molding conditions:

Temperature of metal molding: 136° C.;
Resin temperature: 280° C.;
Injection speed: 30 mm/sec;
Injection pressure: 80 MPa;
Cooling time: 250 sec.

The scanning and imaging optical system according to the present embodiment condenses beams of light deflected by the optical deflector 4 toward the surface 8 to be scanned, to form a light spot for optical scanning on the surface to be scanned. The scanning and imaging optical system has two or more scanning lenses 5 and 6, and at least two of these scanning lenses are resin lenses 5 and 6 formed by plastic molding. When it is assumed that the refractive index distribution in the vertical scanning direction with respect to a position coordinate X is $\Delta n(X)$, in the cross-section in the horizontal scanning direction including the optical axis or in the vertical scanning direction of the resin lenses 5 and 6, the signs of the refractive index distribution $\Delta n(X)$ in the vertical scanning direction are not the same for all resin lenses 5 and 6 included in the scanning and imaging optical system.

Furthermore, since the signs of the refractive index distribution in the vertical scanning direction are not the same for all resin lenses 5 and 6, deterioration in field curvature in the vertical scanning direction resulting from the refractive index distribution, which is present in the respective resin lenses, can be reduced.

Furthermore, since two resin lenses are included in the scanning and imaging optical system, and the signs of the refractive index distribution $\Delta n(X)$ in the vertical scanning direction of the two resin lenses 5 and 6 are opposite to each other. The resin lens 5 has a sectional shape in the vertical scanning cross-section (see FIG. 4C) such that refractive index distribution increasing from the optical axis toward the peripheral portion is formed at least in the vertical scanning direction at the time of plastic molding. The other resin lens 6 has a sectional shape in the vertical scanning cross-section (see FIG. 4D) such that refractive index distribution decreasing from the optical axis toward the peripheral portion is formed at least in the vertical scanning direction at the time of plastic molding.

The one resin lens 5 has a thickness in the direction of the optical axis larger than the width in the vertical scanning direction, and the other resin lens 6 has a thickness in the direction of the optical axis smaller than the width in the vertical scanning direction. Furthermore, the other resin lens 6 has ribs outside the beam passing area at least in the vertical scanning direction, and the width (9.9 mm) of the rib in the direction of the optical axis is larger than the thickness (4.9 mm) in the direction of the optical axis.

The optical scanner in FIG. 1 that uses the scanning and imaging optical system according to the present embodiment performs optical scanning by deflecting the beams from the light source 1 by the optical deflector 4, and condensing the deflected beams toward the surface 8 to be scanned by the scanning and imaging optical systems 5 and 6, to form a light spot on the surface 8 to be scanned.

Furthermore, a rotary polygon mirror is used as the optical deflector 4, the beams from the light source 1 is imaged as a line image long in the horizontal scanning direction near the deflection reflecting surface of the optical deflector, and the scanning and imaging optical systems 5 and 6 are respectively an anamorphic imaging optical system in which the position of the deflection reflecting surface and the position of the surface to be scanned are in a conjugate relation in the vertical scanning direction.

Therefore, using the scanning and imaging optical system according to the present embodiment as the optical system in the optical scanner shown in FIG. 1, arranging a photosensitive medium so as to agree with the surface 8 to be scanned, and performing optical scanning by the optical scanner with respect to the photosensitive medium, the image forming apparatus can be realized. Particularly, image formation can be performed by a well-known electrostatic photographic process, by applying, for example, a drum-like photoconductive photosensitive member to the photosensitive medium.

According to the present invention, it is possible to effectively reduce deterioration in an optical characteristic of a scanning and imaging optical system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A scanning and imaging optical system that condenses beams of light deflected by an optical deflector toward a surface to be scanned, to form a light spot for optical scanning on the surface, comprising:
a plurality of scanning lenses, wherein
at least two of the scanning lenses are resin lenses that are formed by plastic molding and signs of a refractive index distribution $\Delta n(X)$ at least in a vertical scanning direction of the two resin lenses are opposite to each other,
a position coordinate in a horizontal scanning direction or in the vertical scanning direction is X, the refractive index distribution in a cross-section with respect to the position coordinate X is $\Delta n(X)$, the refractive index distribution is in a cross-section in the horizontal scanning direction that includes an optical axis or in the vertical scanning direction of the resin lenses, and signs of the refractive index distribution $\Delta n(X)$ at least in the vertical scanning direction are not identical for all of the resin lenses,
one of the resin lenses has a thickness in a direction of the optical axis that is larger than an effective width in the vertical scanning direction and has a sectional shape in which the refractive index distribution, at least in the vertical scanning direction, increases toward a rim from a portion near the optical axis, the sectional shape being a shape of a cross-section in the vertical scanning direction, and
another one of the resin lenses has a thickness in the direction of the optical axis that is smaller than an effective width in the vertical scanning direction and has a sectional shape in which the refractive index distribution, at least in the vertical scanning direction, decreases toward a rim from a portion near the optical axis, the sectional shape being a shape of a cross-section in the vertical scanning direction.

2. The scanning and imaging optical system according to claim 1, wherein deterioration in field curvature in the resin lenses in the vertical scanning direction is reduced.

3. The scanning and imaging optical system according to claim 1, wherein
the other of the resin lenses includes a rib that is arranged outside an area through which the beams pass at least in the vertical scanning direction, and
a width of the rib in the direction of the optical axis is larger in value than the thickness of the other of the resin lenses.

4. The scanning and imaging optical system according to claim 1, wherein
the refractive index distribution of the one of the resin lenses is substantially constant in the horizontal scanning direction, and
the refractive index distribution of the another one of the resin lenses is substantially constant in the horizontal scanning direction.

5. The scanning and imaging optical system according to claim 4, wherein
an amount of change in the refractive index distribution in the vertical scanning direction of the one of the resin lenses increases in a direction away from a portion near the optical axis, and
an amount of the change in the refractive index distribution in the vertical scanning direction of the another one of the resin lenses increases in a direction away from a portion near the optical axis.

6. An optical scanner that performs optical scanning by deflecting beams of light from a light source by an optical deflector, and condensing the beams deflected toward a surface to be scanned to form a light spot on the surface, comprising:
a scanning and imaging optical system that includes a plurality of scanning lenses, and with which the beams deflected are condensed, wherein
at least two of the scanning lenses are resin lenses that are formed by plastic molding and signs of a refractive index distribution $\Delta n(X)$ at least in a vertical scanning direction of the two resin lenses are opposite to each other,
a position coordinate in a horizontal scanning direction or in the vertical scanning direction is X, the refractive index distribution in a cross-section with respect to the position coordinate X is $\Delta n(X)$, the refractive index distribution is in a cross-section in the horizontal scanning direction that includes an optical axis or in the vertical scanning direction of the resin lenses, and signs of the refractive index distribution $\Delta n(X)$ at least in the vertical scanning direction are not identical for all of the resin lenses,
one of the resin lenses has a thickness in a direction of the optical axis that is larger than an effective width in the vertical scanning direction and has a sectional shape in which the refractive index distribution, at least in the vertical scanning direction, increases toward a rim from a portion near the optical axis, the sectional shape being a shape of a cross-section in the vertical scanning direction, and
another one of the resin lenses has a thickness in the direction of the optical axis that is smaller than an effective width in the vertical scanning direction and has a sectional shape in which the refractive index distribution, at least in the vertical scanning direction, decreases toward a rim from a portion near the optical axis, the sectional shape being a shape of a cross-section in the vertical scanning direction.

7. The optical scanner according to claim 6, wherein the optical deflector is a rotary polygon mirror,
the beams are converted to be substantially parallel and each beam is deflected as a line image long in the horizontal scanning direction near a deflection reflecting surface of the optical deflector, and
the scanning and imaging optical system is an anamorphic imaging optical system in which a position of the deflection reflecting surface and a position of the surface to be scanned are substantially conjugate with respect to the vertical scanning direction.

8. The optical scanner according to claim 6, wherein the refractive index distribution of the one of the resin lenses is substantially constant in the horizontal scanning direction, and the refractive index distribution of the another one of the resin lenses is substantially constant in the horizontal scanning direction.

9. The optical scanner according to claim 8, wherein
an amount of change in the refractive index distribution in the vertical scanning direction of the one of the resin lenses increases in a direction away from a portion near the optical axis, and
an amount of the change in the refractive index distribution in the vertical scanning direction of the another one of the resin lenses increases in a direction away from a portion near the optical axis.

10. An image forming apparatus that forms an image by performing optical scanning on a photosensitive medium, comprising:

an optical scanner with which the optical scanning is performed by deflecting beams of light from a light source by an optical deflector, and condensing the beams deflected toward a surface to be scanned by a scanning and imaging optical system to form a light spot on the surface, wherein the optical scanner includes the scanning and imaging optical system that includes a plurality of scanning lenses, wherein at least two of the scanning lenses are resin lenses that are formed by plastic molding and signs of a refractive index distribution $\Delta n(X)$ at least in a vertical scanning direction of the two resin lenses are opposite to each other, a position coordinate in a horizontal scanning direction or in the vertical scanning direction is X, the refractive index distribution in a cross-section with respect to the position coordinate X is $\Delta n(X)$, the refractive index distribution is in a cross-section in the horizontal scanning direction that includes an optical axis or in the vertical scanning direction of the resin lenses, and signs of the refractive index distribution $\Delta n(X)$ at least in the vertical scanning direction are not identical for all of the resin lenses, one of the resin lenses has a thickness in a direction of the optical axis that is larger than an effective width in the vertical scanning direction and has a sectional shape in which the refractive index distribution, at least in the vertical scanning direction, increases toward a rim from a portion near the optical axis, the sectional shape being a shape of a cross-section in the vertical scanning direction, and another one of the resin lenses has a thickness in the direction of the optical axis that is smaller than an effective width in the vertical scanning direction and has a sectional shape in which the refractive index distribution, at least in the vertical scanning direction, decreases toward a rim from a portion near the optical axis, the sectional shape being a shape of a cross-section in the vertical scanning direction.

11. The image forming apparatus according to claim 10, wherein the photosensitive medium is a photosensitive element that is photoconductive.

12. The image forming apparatus according to claim 10, wherein the refractive index distribution of the one of the resin lenses is substantially constant in the horizontal scanning direction, and the refractive index distribution of the another one of the resin lenses is substantially constant in the horizontal scanning direction.

13. The image forming apparatus according to claim 12, wherein an amount of change in the refractive index distribution in the vertical scanning direction of the one of the resin lenses increases in a direction away from a portion near the optical axis, and an amount of the change in the refractive index distribution in the vertical scanning direction of the another one of the resin lenses increases in a direction away from a portion near the optical axis.

* * * * *